Sept. 25, 1928.
L. R. McDONALD
DISPLAY APPARATUS
Filed Nov. 17, 1926
1,685,499
4 Sheets-Sheet 1
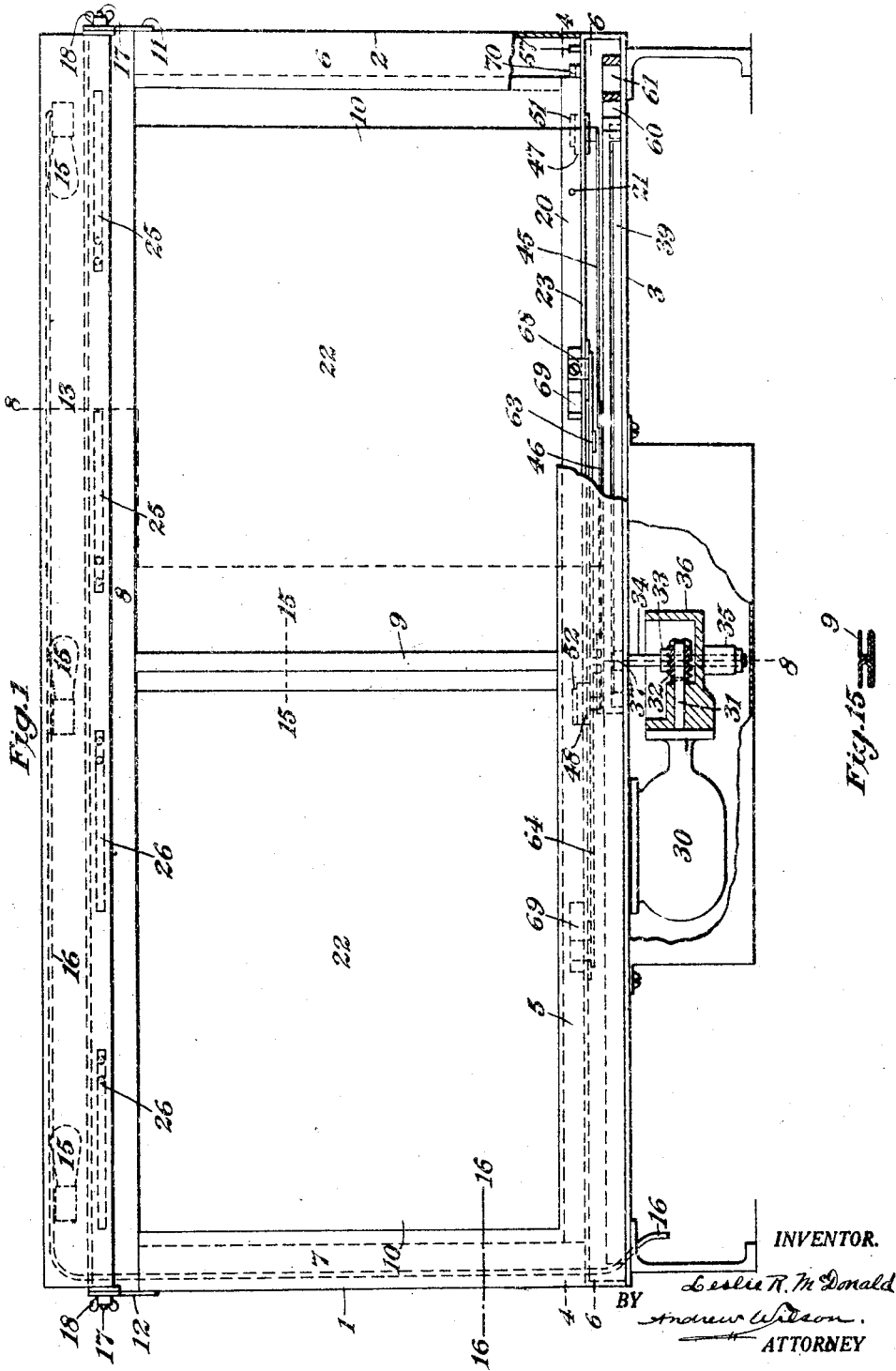
INVENTOR.
Leslie R. McDonald,
BY Andrew Wilson.
ATTORNEY Sept. 25, 1928.
L. R. McDONALD
DISPLAY APPARATUS
Filed Nov. 17, 1926
1,685,499
4 Sheets-Sheet 2
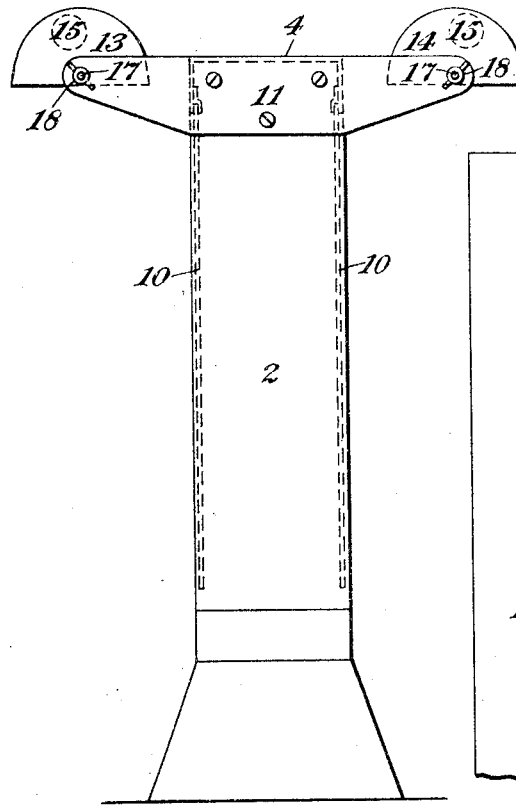
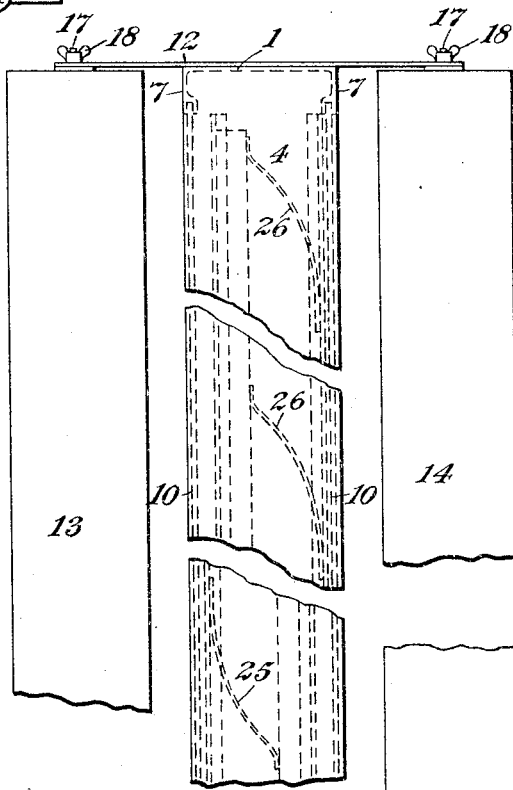
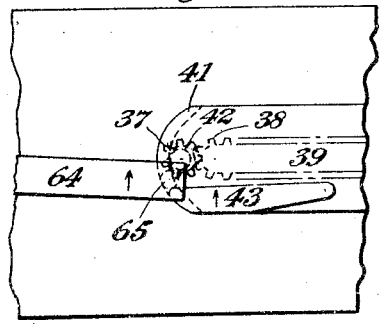
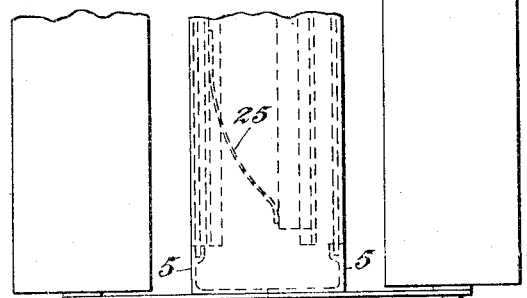
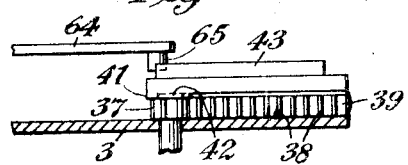
INVENTOR,
Leslie R. McDonald.
BY
ATTORNEY.

Sept. 25, 1928.
L. R. McDONALD
DISPLAY APPARATUS
Filed Nov. 17, 1926
1,685,499
4 Sheets-Sheet 3
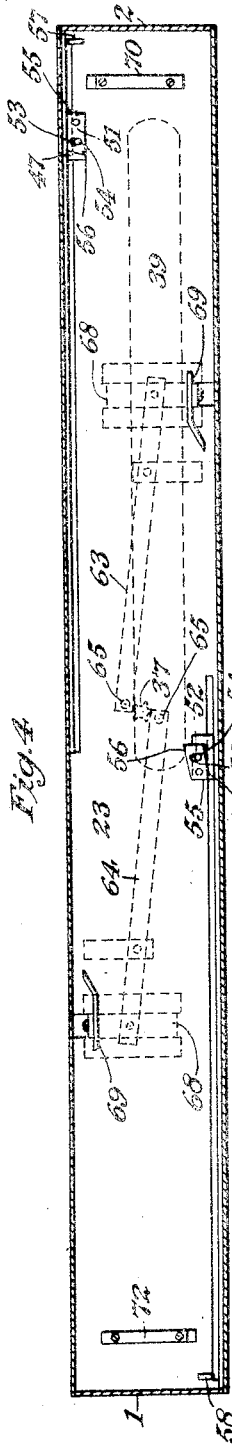
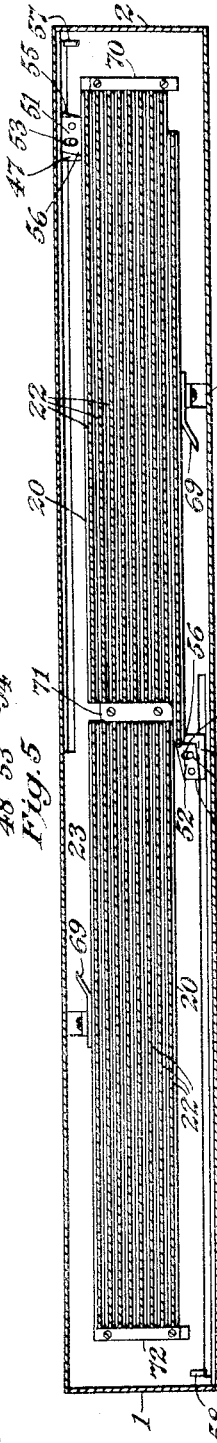
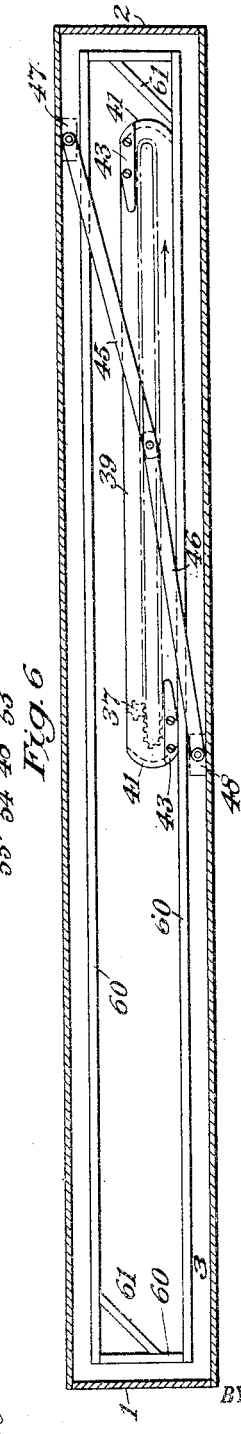
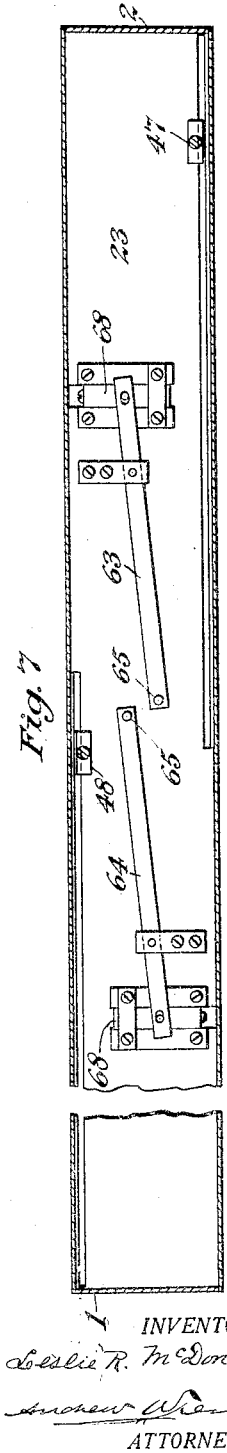
INVENTOR.
Leslie R. McDonald
BY Andrew Wiemen
ATTORNEY.

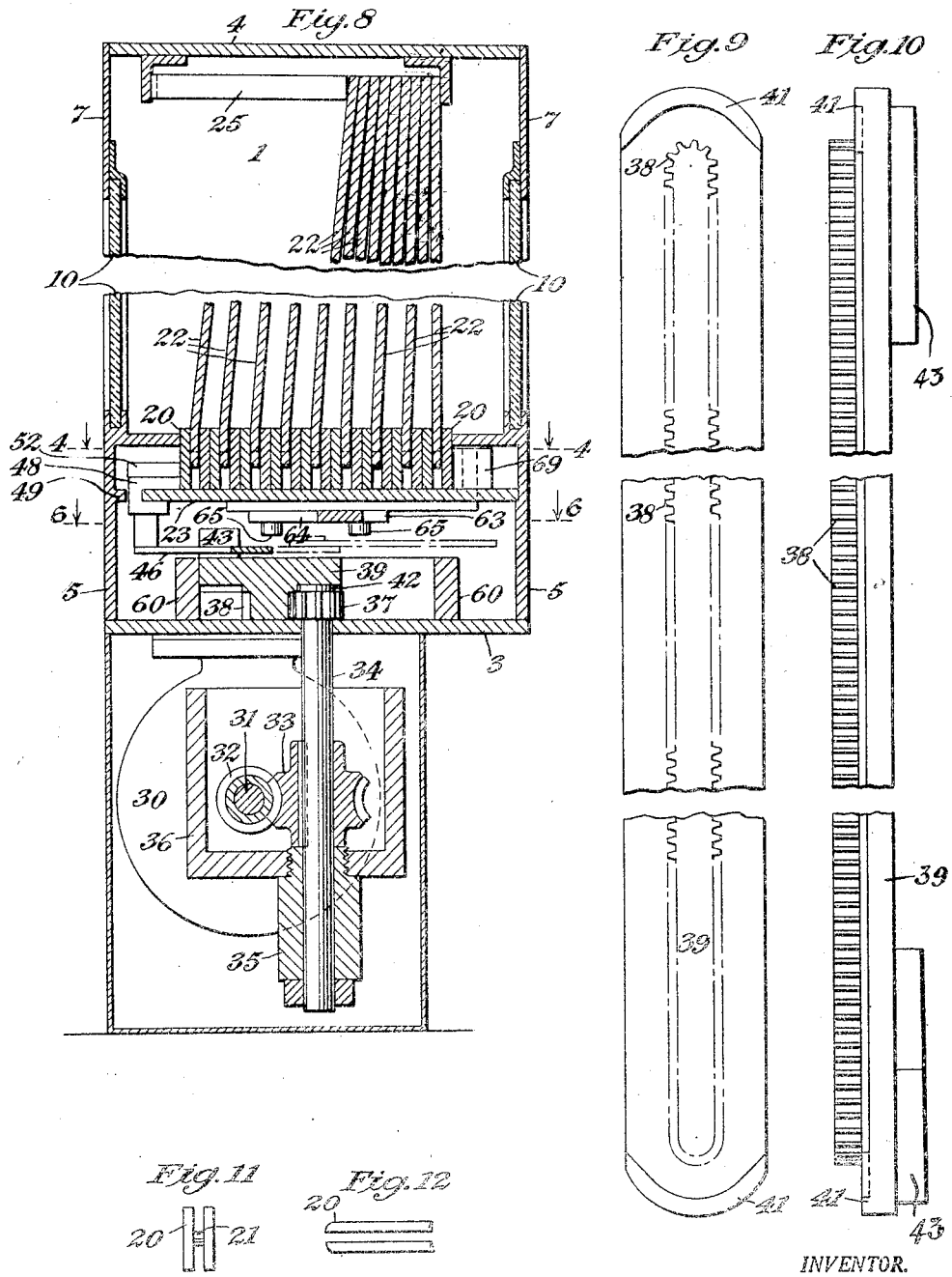

Patented Sept. 25, 1928.

1,685,499

UNITED STATES PATENT OFFICE.

LESLIE R. McDONALD, OF WESTMOUNT, MONTREAL, QUEBEC, CANADA.

DISPLAY APPARATUS.

Application filed November 17, 1926. Serial No. 148,809.

My invention relates to that class of display apparatuses wherein the placards of a series, mounted in a suitable frame work, are moved successively, from one view position laterally into another view position, then transversely into a third view position, from that laterally, in a direction the reverse of the first movement, into a fourth view position, and, finally, transversely into the first view position again; and objects of my improvements are to simplify the mechanism by which these movements are brought about; to make the operating mechanism durable, accurate and dependable in operation; to so locate the mechanism that it will be protected from accidental interference or disarrangement; to provide for the efficient lubrication of the mechanism so that relubrication will only be required at comparatively long intervals; to move the placards but one at a time, so that the period of display of any one placard will be increased; and to assemble the elements of the apparatus in compact and attractive form, whereby its appeal to the observer is increased, and its durability as an advertising or publicity means will be enhanced.

The means whereby these, and other desirable results are obtained, I will now proceed to explain.

In the drawings, Fig. 1 is a front elevation of the apparatus, portions of the casings being broken away to more clearly illustrate the construction; Fig. 2 is an end view; Fig. 3 is a top view, medial portions being broken away to shorten the figure; Fig. 4 is a longitudinal sectional view of the placard floor of the apparatus, taken on the line 4—4 of Figs. 1 and 8 looking down, the outer casing and the placards and the holders 20 being removed; Fig. 5 is a similar view showing the placards in position; Fig. 6 is a similar view taken substantially on the line 6—6 of Figs. 1 and 8; Fig. 7 is a similar view, taken substantially on the same line, looking up, a medial portion being omitted to shorten the figure; Fig. 8 is a sectional view, with a medial portion broken away to shorten the figure, taken on the line 8—8 of Fig. 1, looking to the left, the reflectors, bulbs and wiring being omitted; Fig. 9 is a view of the under side of the sliding rack bar, medial parts being broken out to shorten the figure; Fig. 10 is a side view of the same; Fig. 11 is an end view of a placard holder; Fig. 12 is a top view of one end of a placard holder; Fig. 13 is a plan view of a detail of parts of pinion, rack bar and transverse shifting mechanism; Fig. 14 is a view of the same parts taken as looking up on Fig. 13; Fig. 15 is a cross sectional view, taken on the line 15—15 of Fig. 1, looking down, somewhat enlarged, of the moulding bar of the case; and Fig. 16 is a cross sectional view of an end moulding, enlarged as compared with Fig. 3 taken when viewed from the left as on line 16—16 of Fig. 1, looking up. Figs. 13 and 14 are on an enlarged scale, as compared with Figs. 1 to 7; and Figs. 8 to 12 are on a still further enlarged scale.

The apparatus is mounted in a suitable frame, which is shown, as being provided with ends 1, 2; bottom 3; and top 4. Suitable facing elements or mouldings are placed around the sides of the apparatus, as 5, 6, 7 and 8, and a center moulding 9 divides the space on each side into two compartments, the construction being the same on both sides of the frame. These mouldings are provided with suitable grooves to receive and hold the glass, 10, 10.

Brackets 11, 12, on the ends 1, 2, support reflectors 13, 14, housing light bulbs 15, 15, connected by suitable wiring, as 16, with a source of electric current, not shown.

The reflectors are, preferably, adjustable, as by means of bolts 17, 17, passing through the brackets and the reflectors' ends and secured by wing nuts 18, 18. This provides for a proper illumination of the faces of the placards.

A series of placard holders, 20, 20, preferably made of two flat bars or strips of metal, spaced apart by suitable studs or rivets 21, so as to accommodate the bottom of a placard, 22, between them, and also preferably rounded inwardly at their ends, as shown in Fig. 12, are arranged to slide longitudinally and laterally on a plate 23 forming the bottom of the placard compartments of the frame.

Springs 25, 25, yieldably press the tops of the placards in the right hand compartment backward, and similar springs 26, 26, press the tops of the placards in the left hand compartment forward, thus assuring the proper vertical alignment of each placard when it is in place to be shifted longitudinally. The shifting of the placards is done by the following mechanism.

An electric motor 30 is mounted below the frame, its shaft 31 carrying a worm 32, meshing with a worm gear 33, on a shaft 34, mounted in a bearing 35, in the bottom of a grease cup 36 carried by the casing of the motor 30. The upper end of the shaft 34 passes up through the bottom 3 of the frame, and carries a pinion 37, meshing with the teeth 38, 38 on a rack bar 39, which slides on the bottom 3 of the frame.

The upper edges and ends of the rack bar 39 extend out beyond its rack teeth; and the under sides of the ends are provided with rib-like members 41. The parts are so proportioned that these ribs will pass above the teeth of the pinion 37, and will intercept a ring 42 journalled on the end of the shaft 34.

The rack bar is also provided, upon its upper side with flanges 43, 43, which serve to actuate the mechanism for pushing the placards transversely, as will be explained later.

Centrally of the upper side of the rack bar two arms 45, 46 are pivoted, their free ends being pivoted to slides 47, 48 adapted to straddle and slide along the edges on opposite sides of the plate 23, being held to duty by such suitable means as a stop or flange 49 on the facing 5.

Each slide is provided with a dog 51 or 52 pivoted to its upper face and provided with a slot 53, into which projects a stop pin 54 on the slide. By swinging a dog on its pivot the corner of one end 55, which may be called the heel, may be thrown out past the end of the slide; and by swinging the dog in the other direction a corner of its other end 56, which may be called the toe, may be thrown inward toward the placards.

Toward the ends of the frame are stops 57, 58 adapted to arrest the heels of the dogs, when pushed toward the stops.

On the upper side of the plate 3 a rack bar race is formed within a rib or flange 60, the sides of which are parallel, while the ends are partially sloping or diagonal, as at 61.

On the under side of the plate 23 are pivoted two arms, each provided at one end with a pin 65, and, at the other end, being linked by a slot and pin connection, with a slide 68, traveling between suitable guides, one end of the slide turning up through a slot in the plate 23 and carrying a placard packer 69.

The pins 65 lie in the path of movement of the flanges 43 on the rack bar, so that the movements of the rack bar will rock the arms 63, 64 and cause first one and then the other of the placard packers 69 to be pushed in against the series of placards behind them.

The operation of my apparatus is as follows:—

A number of placards mounted in their holders are assembled on the placard floor of the apparatus, the number employed being preferably an unequal number, so that one placard compartment will contain one more placard than the other. Thus, in Fig. 5, the odd placard is shown as nearly slid into place in the right hand compartment; and the other figures show the mechanism in positions appropriate for this position of the placard. With the motor in operation so that the pinion 37, as shown in Figs. 4, 6 and 13, is given an anti-clockwise movement, this cycle of operations takes place:—

The pinion pushes the rack bar to the right, causing the right hand end of the rack bar to meet the diagonal end 61 of the compartment within the flange 60, and to travel inward toward the other side of the compartment. The other end of the rack on the rack bar travels to the right of the pinion and backward around it until the edge of the rack bar is brought against the back side of the compartment 60. In this movement the ring 42, traveling inside of the rib 41, prevents the rack bar from escaping from the pinion. The movement of the rack bar to the right causes the arm 45 to push its slide 47 along until the heel of the dog 51 strikes the stop 57, rocking the toe of the dog over behind the end of the rearmost placard. Simultaneously the slide 48 has reached the end of its travel to the right and has carried the placard holder in front of it over into proper position for shifting to the rear. The travel of the placard holder is limited by the stop 70; and its reverse movement is prevented by another stop 71.

The movement of the left hand end of the rack bar around the pinion 37, causes the flange 43 to engage the pin 65 of arm 64, pushing the placard packer 69 in against the placard holders and shifting them transversely so as to leave a clear space to receive the next placard moved from right to left at the rear. The rack bar then travels from right to left pushing the slides 47, 48 in that direction, the dog of 47 engaging and pushing before it the rearmost placard carrier, while the dog of 48 swings forward as it slides back past the adjacent placard holder.

As the end of the rack bar swings around the pinion, and when the end of the front placard holder has been shifted far enough to the right to clear the holders in the left hand compartment, the flange 43 encounters pin 65 on arm 64, rocking that end of the arm backward and so causing its placard packer 69 to push the placard carriers and their placards in the left hand compartment all forward, so as to leave room behind them for the placard carrier which advances from right to left at the rear of the right hand compartment.

The continued movement of the rack bar to the left causes the flange 43 to clear the pin 65 of arm 64, leaving the slide 68 and placard packer 69 free to move back to the rear when the forward end of the placard carrier encounters the outwardly sloping end of the packer and pushes past it, shoving the packer back behind the carrier, the carrier continuing its movement until it reaches the stop 72.

Th rack bar then is moved by the pinion 37 to the front of the rack bar compartment, the packer 69 on arm 63 pushes the carriers in the right hand compartment to the rear, the dog 52 on slide 48 engages the front carrier in the left hand compartment and pushes it to the right, and the slide 47 and its dog 51 are returned to the right, also.

The cycle of operation then repeats itself, as long as the pinion 37 is turned by the motor.

The corners of the stop 71, past which the carriers are pushed transversely, are preferably curved or rounded off to insure the ends of the carriers slipping past them and into place, if, because of back lash in the mechanism, or other variation of movement, the carriers' ends might not otherwise fully clear the stop.

This construction permits the rack bar compartment to be supplied liberally with grease to facilitate the movements of the rack bar and its connections; and as the apparatus is used with the compartment level and closed in below the placard floor, this lubrication will serve for a comparatively long period without renewal or replenishment.

The box 36, also, may be filled with a heavy oil or grease, so that the parts within it travel in a lubricant the volume of which is large enough to dispense with frequent replenishment or change.

Such provisions for lubrication are important. For the apparatus is intended to run during long periods of the day and from day to day, without the direct supervision of a mechanician or operator.

It will be understood that details of construction of the apparatus may be modified, as by the substitution of mechanical equivalents, without departing from the spirit of my invention as claimed.

Having thus described my invention, what I claim and desire to secure by Letters Patent of the United States, is:—

1. In a display apparatus, the combination of a case provided with a plurality of placard compartments therein, a series of placard carriers, transferably disposed in said compartments, means for shifting a placard carrier laterally, means for shifting it transversely, such placard shifting means embracing a reciprocable rack bar and a rotating pinion having a fixed position and in mesh with the rack bar and means for rotating the pinion continuously.

2. In a display apparatus, the combination of a case provided with a plurality of placard compartments therein, a series of placard carriers, transferably disposed in said compartments, reciprocable means for shifting a placard carrier laterally, reciprocable means for shifting it transversely, such placard shifting means embracing a reciprocable rack bar and a rotating pinion having a fixed position and in mesh with the rack bar, and means for rotating the pinion continuously.

3. In a display apparatus, the combination of a case provided with a plurality of placard compartments therein, a series of placard carriers, transferably disposed in said compartments, means for shifting a placard carrier laterally, means for shifting it transversely, such placard shifting means embracing a double sided rack bar, having a continuous series of teeth along both sides and around its ends, guide elements forming an enclosed compartment within which the bar is slidably disposed and guided in reciprocatory and oscillatory movements, an actuating pinion having a fixed position and in mesh with said rack bar, and means for rotating the pinion.

4. In a display apparatus, the combination of a case provided with a plurality of placard compartments, a series of placard carriers slidably disposed therein, means for shifting a placard carrier laterally and means for shifting it transversely, such means embracing an actuating pinion having a fixed position, a rack bar track, a slidable bar, provided with a continuous series of rack teeth around the same meshing with the pinion, means for maintaining continuous contact between the rack teeth and the pinion, whereby the rack bar is reciprocated from side to side and carried around the pinion.

5. In a display apparatus, the combination of a case provided with a plurality of placard compartments, a series of placard carriers slidably disposed therein, an actuating pinion having a fixed position, a rack bar track, a slidable rack bar provided with a loop rack thereon and continuously in mesh with the pinion, and means, actuated by the rack bar, for successively sliding the carrier groups laterally and transversely.

6. In a display apparatus, the combination of a case provided with a plurality of placard compartments, a series of placard carriers slidably disposed therein, means for shifting the placard carriers laterally and transversely embodying an actuating pinion having a fixed position, a rack bar track, a slidable rack bar provided with a loop rack thereon and continuously in mesh with the pinion, and means, actuated by the rack bar and displaceable by the lateral movement of a carrier, for successively sliding the carrier groups transversely.

7. In a display apparatus, the combination of a case provided with a plurality of placard compartments, a series of placard carriers slidably disposed therein, means for shifting the placard carriers laterally and transversely embodying carrier engaging means, an actuating unit, a rigid, slidable transferring unit moved bodily and continuously, longitudinally and laterally in a reciprocatory path by the actuating unit and actuating the carrier engaging means.

8. In a display apparatus, the combination of a case provided with a plurality of placard compartments, a series of placard carriers slidably disposed therein, means for shifting the placard carriers laterally and transversely embodying an actuating unit, a rigid, slidable transferring unit moved continuously longitudinally and laterally in a reciprocatory path by the actuating unit, carrier engaging means for lateral shifting, and carrier group moving means, for transverse shifting, periodically actuated and released by the transferring unit.

LESLIE R. McDONALD.